(12) United States Patent
Sinnan Muthusamy et al.

(10) Patent No.: US 11,436,072 B2
(45) Date of Patent: Sep. 6, 2022

(54) SYSTEM AND METHOD FOR COLLECTING CONTEXTUAL LOG FILES FROM A COMPUTING SYSTEM

(71) Applicant: HEWLETT PACKARD ENTERPRISE DEVELOPMENT LP, Houston, TX (US)

(72) Inventors: Poornachandran Sinnan Muthusamy, Bangalore (IN); Bino Joseph Polackal, Bangalore (IN); Haindavi Nagarajan, Bangalore (IN); Rajeevalochana Kallur, Bangalore (IN); Shubham Nagar, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 127 days.

(21) Appl. No.: 16/803,442

(22) Filed: Feb. 27, 2020

(65) Prior Publication Data

US 2021/0271540 A1 Sep. 2, 2021

(51) Int. Cl.
*G06F 11/07* (2006.01)
*G06F 11/32* (2006.01)

(52) U.S. Cl.
CPC ........ *G06F 11/0772* (2013.01); *G06F 11/079* (2013.01); *G06F 11/0781* (2013.01); *G06F 11/327* (2013.01)

(58) Field of Classification Search
CPC ............. G06F 11/0772; G06F 11/0781; G06F 11/079; G06F 11/327
See application file for complete search history.

(56) References Cited

U.S. PATENT DOCUMENTS

| 6,944,800 | B2 | 9/2005 | Brundridge et al. |
| 8,161,325 | B2 | 4/2012 | Calman et al. |
| 8,171,343 | B2 | 5/2012 | Beg et al. |
| 9,274,902 | B1 * | 3/2016 | Morley ............... G06F 11/0709 |
| 9,311,176 | B1 * | 4/2016 | Khokhar ................. G06F 11/30 |

(Continued)

OTHER PUBLICATIONS

Zawawy et al., "Log Filtering and Interpretation for Root Cause Analysis", 26th IEEE International Conference on Software Maintenance, 2010, 5 pages.

*Primary Examiner* — Bryce P Bonzo
*Assistant Examiner* — Matthew N Putaraksa
(74) *Attorney, Agent, or Firm* — Hewlett Packard Enterprise Patent Department

(57) ABSTRACT

Example implementations relate to method and management system for collecting contextual log files to an issue in a computing system. The method includes analyzing alert data to identify a current symptom associated with the issue in the computing system, and determining whether the current symptom exists in a first lookup table including a plurality of first symptoms and a plurality of first log categories. Each first symptom is mapped to one or more first log categories in the first lookup table. In response to determining that the current symptom exists in the first lookup table, the method includes collecting one or more log files from a plurality of log files corresponding to the one or more first log categories mapped to the current symptom, from the computing system. Further, the method includes transferring the one or more log files to an external computing system for performing diagnostics on the issue.

20 Claims, 6 Drawing Sheets

(56) References Cited

U.S. PATENT DOCUMENTS

| | | | |
|---|---|---|---|
| 10,372,595 B1* | 8/2019 | Chopra | G06F 11/079 |
| 10,394,691 B1* | 8/2019 | Cole | G06F 11/3612 |
| 11,226,858 B1* | 1/2022 | Srivastava | G06F 11/3476 |
| 2007/0083630 A1* | 4/2007 | Roth | H04L 43/50 |
| | | | 714/E11.207 |
| 2009/0210745 A1 | 8/2009 | Becker et al. | |
| 2014/0075327 A1* | 3/2014 | Noel | G06F 9/542 |
| | | | 715/744 |
| 2017/0230263 A1* | 8/2017 | Shelton | H04L 43/12 |
| 2019/0132191 A1* | 5/2019 | Mann | G06N 5/046 |
| 2020/0201699 A1* | 6/2020 | Yu | G06F 11/32 |
| 2020/0241947 A1* | 7/2020 | Gonoji | G06F 11/0751 |
| 2020/0241949 A1* | 7/2020 | Basu | G06F 11/079 |
| 2020/0344252 A1* | 10/2020 | Menon | G06F 16/906 |
| 2020/0349003 A1* | 11/2020 | Liu | G06F 11/0772 |
| 2021/0089945 A1* | 3/2021 | Gibbs | G06N 5/02 |
| 2021/0306201 A1* | 9/2021 | Wang | H04L 41/064 |
| 2022/0027230 A1* | 1/2022 | Burch | G06F 11/348 |
| 2022/0066897 A1* | 3/2022 | Elyasi | G06F 3/064 |

\* cited by examiner

SYSTEM AND METHOD FOR COLLECTING CONTEXTUAL LOG FILES FROM A COMPUTING SYSTEM

BACKGROUND

Log files are used in a computing system to store events and informational messages about the computing system status and/or application status (among other things) running on the computing system. Whenever issues such as fault events occur in the computing system, a logger program may record the issues in corresponding log file. Later, customers or administrators of the computing system may transfer a super set of all log files to a backend support team for root causing/diagnosing the issues.

BRIEF DESCRIPTION OF THE DRAWINGS

Various examples will be described below with reference to the following figures.

Figure 1:
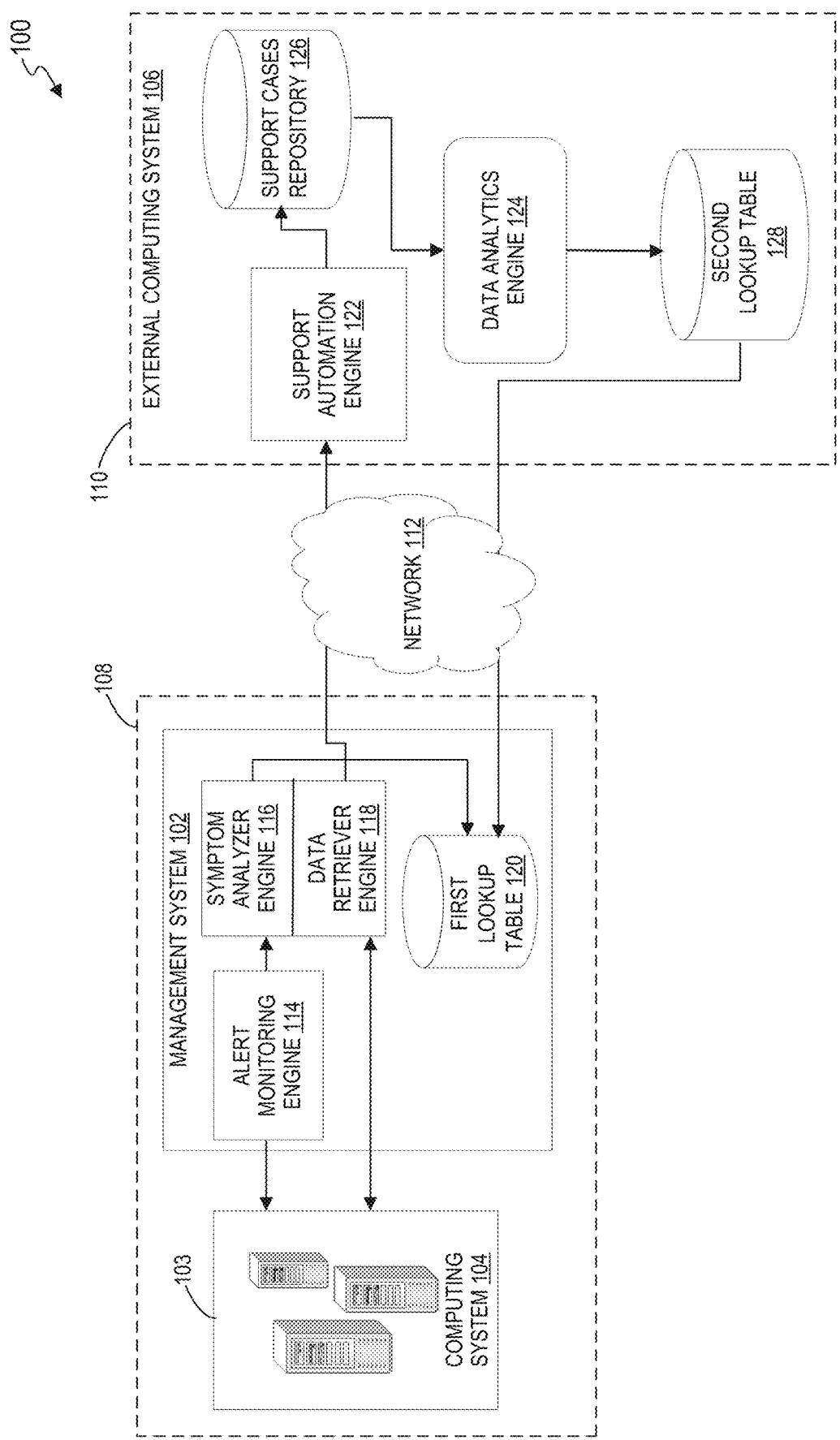
FIG. 1 is a block diagram depicting an example environment in which various examples may be implemented as a management system that facilitates collecting contextual log files from a data center, in accordance with embodiments of the present disclosure.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The present disclosure describes example implementations of a management system for collecting and transferring contextual log files from a computing system to an external computing system for performing diagnostics on issue. In particular, the disclosed examples may include systems, devices, computer-readable storage media, and methods for analyzing issue i.e., fault event occurred in the computing system to identify a current symptom associated with the issue, and collect and transfer log files related or contextual to the current symptom from the computing system to the external computing system. In one or more embodiments, the management system may first determine whether the current symptom exists in a lookup table. Later, in response to determination that the current symptom exists in the lookup table, the management system may perform lookup into log categories mapped to the current symptom in the lookup table, and collect the log files corresponding to the log categories, from the computing system. As used herein, the term "symptom" may refer to indication of a health condition of one or more components of the computing system 104. For example, the computing system 104 may be considered to be behaving normally or operating healthy when a plurality of variables (that are indicative of the health condition of the computing system 104) corresponding to one or more components of the computing system are within a predefined range or threshold. If one or more of the variables are outside of the predefined range or threshold, a symptom may be determined to exist. In other examples, a symptom can be defined as when the variables meet one or more particular characteristics. Further, the management system may transfer the collected log files to the external computing system for diagnosing the issue.

For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 4 is an example and is not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. Such modifications and variations are intended to be included within the scope of this disclosure and protected by the following claims.

At times, the computing system may encounter some undesirable or abnormal events, also referred to herein as fault events or issues. For example, one or more memory components of the computing system may fail to store data in the correct memory location, or not store the data at all, or become unresponsive. Also, a central processing unit (CPU) of the computing system may enter an error state where it cannot process further instructions. Similarly, a networking component of the computing system may exhibit signs of faulty communication (e.g., data is intermittently received or out of expected order) or simply cease sending or receiving data. External factors related to the computing system, such as component overheating, electricity fluctuations, and human error may also cause well-performing components to enter fault state. Serious faults are sometimes preceded by progressive declines in performance (e.g., a network card may exhibit signs of increasingly slower data communication before it shuts down completely).

In at least some implementations, a logger program running in the computing system may record the fault event in corresponding log files or table, when the fault event occurs. Traditionally, customers and/or data center administrators may manually file support cases with backend support team, when such fault event occurs in the computing system for diagnosing/root causing the issue. In such scenarios, the customers or the administrators may attach large amounts of data, such as active health system (AHS) files, logs, events, screenshots, and the like for the backend support team to analyze and root cause the issue. The process of filing the support cases can be automated using an auto-management tool. However, this has also resulted in increasing the amount of data being transferred by the auto-management tool to the backend support team. On a per day average, a data center with tens of thousands of computing systems may send tens or hundreds of gigabytes of data to the backend support team for diagnostics. In some examples, the auto logger tool can provide the log files or table after the fault event occurs. In one example, a baseboard management controller can provide the log files, where the baseboard management controller is part of a separate subsystem of the computing system that failed and is able to provide such information out of band. In some examples, the baseboard management controller can be separate from a central processor executing a host operating system on the computing system. In other examples, the auto-management tool may provide the log files or table after a reboot or by reading from a storage that the logs are stored at even while the computing system has failed.

When customers or the auto-management tool notice an issue in the computing system, the customer or management tool may not be aware of what the relevant data (logs files) is that may need to be transferred to the backend support team for analysis. Thus, they may transfer super set of all log files, such as active health system (AHS) logs, command line interface (CLI) logs files, representational state transfer (REST) output log files, operating system (OS) specific log files, and the like to the backend support team. The majority of the log files received by the backend support team for diagnostics or root causing the issue, may be not relevant and sometimes those log files may mislead the actual issue and in turn may add more time in root causing the issue. In other words, the majority of the log files sent to backend support team may not be relevant for characterization of the issue in the computing system. Additionally, collecting, transferring, storing, and processing huge volume of the log files may consume resources, such as network, storage, central processing unit (CPU), and memory for both customers and backend support team.

A technical solution to the aforementioned problems may leverage a smart contextual log files collection technique applied by a management system, to efficiently collect the log files that are relevant to the actual issues in the computing system rather than collecting all log files in the computing system. In one or more embodiments, the management system may first analyze alert data, such as events and/or parameters received from the computing system to identify a current symptom associated with the issue. Later, the management system may determine whether the current symptom exists in a first lookup table. In response to a determination that the current symptom exists in the first lookup table, the management system may perform a lookup into log categories mapped to the current symptom in the first lookup table, and collect and transfer only those log files which corresponds to the log categories, from the computing system to the external computing system. Hence, the technical solutions discussed herein may reduce collecting and transferring a super set of all log files in the computing system to the external computing system (backend support team) for diagnosing/root causing the issue. Additionally, the techniques applied in the present disclosure may help to reduce unnecessary consumption of the computing resources, such as network, storage, CPU, and memory associated with collecting, transferring, storing, and processing large volumes of the log files for both customers and backend support team. Further, the techniques applied in the present disclosure may help the backend support team to analyze a reduced set of log files that are relevant to the issue. This can allow the support team quickly characterize/root cause the issue in the computing system.

In one or more embodiments, the external computing system may have a data repository of historical support cases including logs files, such as AHS files, command line interface (CLI) logs files, REST output log files, operating system (OS) specific log files, resolutions for each support case, and the like. In such examples, the external computing system may use the repository of the historical support cases as input to identify symptoms, and derive correlations between the identified symptoms and log categories for each support case to generate a second lookup table. Thereafter, a copy of the second lookup table is stored in the management system, in the form of the first lookup table, which may be used for performing the on premise lookup of the current symptom in the first lookup table, as discussed herein.

In some other examples, in response to determining that the current symptom do not exists in the first lookup table, the management system may collect and transfer the super set of all log files in the computing system to the external computing system. In such example embodiments, the external computing system may analyze the super set of all log files to identify a fresh symptom, and further determine whether the fresh symptom exists in the data set which was used to create the second lookup table. If the fresh symptom exists in the data set, then the external computing system may generate a third lookup table and compare the third lookup table with the second lookup table. Thereafter, if it is determined that the third lookup table is not identical to the second lookup table, the external computing system may replace the second lookup table with the third lookup table and a copy of replaced second lookup table is transferred to the management system. Accordingly, the management system may also replace the first lookup table with the copy of replaced second lookup table, and use replaced first lookup table for performing the on premise lookup of the current symptom, as discussed herein. Thus, the techniques described in the present disclosure additionally teach usage of machine learning technique to continuous refine the second lookup table by identifying and correlating new/fresh symptoms and associated log categories.

FIG. 1 illustrates an example environment 100, in which various examples may be implemented as an industrial system, or an enterprise system, or a consumer system, which facilitates a management system 102 to collect contextual log files from a data center 103 and transfer it to an external computing system 106. In some non-limiting examples, the environment 100 may be implemented as the industrial system for managing a production line or an assembly line of an industrial plant, or as the enterprise system for managing conference rooms of the enterprise, or as the consumer system for managing a smart home or a smart city.

The management system 102 is operably coupled to the data center 103 and the external computing system 106. In one or more embodiments, the management system 102 and the data center 103 may be collectively referred to as a frontend system 108, and the external computing system 106 may be referred to as a backend system 110. During operation, the frontend system 108 may manage at least one of the industrial system, the enterprise system, or the consumer system, and the backend system 110 may support the frontend system 108. The frontend system 108 and the backend system 110 may be operably coupled to each other over a network 112. In some embodiments, the network 112 may be a TCP/IP (Transmission Control Protocol/Internet Protocol) network, which is a suite of communication protocols used to interconnect network devices on internet.

The data center 103 may host one or more computing resources, such as computing systems 104 (servers), storage systems, routers, and the like, disposed in a rack, to centralize IT operations and the one or more computing resources, as well to store, manage, and distribute computing data in more viable manner. In some other examples, the environment 100 may include a plurality of data centers, without deviating from the scope of the present disclosure.

The management system 102 may be an appliance deployed in the data center 103 for performing certain functionalities, such as discovering the computing systems 104 in the data center 103, managing inventory in the data center 103, monitoring the computing systems 104, and the like. In accordance to present implementation, the management system 102 may include an alert monitoring engine 114, a symptom analyzer engine 116, and a data retriever engine 118. In one or more embodiments, each of the alert monitoring engine 114, the symptom analyzer engine 116, and the data retriever engine 118 may be a software module, or a hardware module, or combinations of both. Further, the alert monitoring engine 114, the symptom analyzer engine 116, and the data retriever engine 118 may be implemented using a first processing resource (not shown) of the management system 102. In particular, the first processing resource may implement functionalities of the alert monitoring engine 114, the symptom analyzer engine 116, and the data retriever engine 118 by executing program instructions stored in a first machine readable medium (not shown) of the management system 102. The functionalities of each of the alert monitoring engine 114, the symptom analyzer engine 116, and the data retriever engine 118 are described in greater details below. In one or more embodiments, the management system 102 may interact with the computing resources, for example, the computing system 104 via a controller (not shown), such as management controller deployed in the computing system 104. In some examples, the management controller may be a baseboard management controller (BMC).

The management system 102 may additionally include a first lookup table 120 stored in the first machine readable medium. In one or more embodiments, the first lookup table 120 is a pre-generated lookup table. The first lookup table 120 may include a plurality of first symptoms, where each first symptom is mapped to one or more first log categories. The method of generating the first lookup table 120 and the content of the first lookup table 120 are described in greater detail below.

The external computing system 106 may include a server or other computing device that may be accessed by support engineers (backend support team) for investigating and root causing issue related to the computing systems 104 by analyzing log files received from the computing systems 104 via the management system 102. In accordance to the present implementation, the external computing system 106 may include a support automation engine 122 and a data analytics engine 124. In one or more embodiments, each of the support automation engine 122 and the data analytics engine 124 may be a software module, or a hardware module, or combinations of both. Further, the support automation engine 122 and the data analytics engine 124 may be implemented using a second processing resource (not shown) of the external computing system 106. In particular, the second processing resource may implement functionalities of the support automation engine 122 and the data analytics engine 124 by executing program instructions stored in a second machine readable medium (not shown) of the external computing system 106. The functionalities of each of the support automation engine 122 and the data analytics engine 124 are described in greater details below.

The external computing system 106 may additionally include a support cases repository 126 and a second lookup table 128 stored in the second machine readable medium. The support cases repository 126 may store historical support cases, the log files related to each support case, and resolutions for each support case. The second lookup table 128 may include a plurality of second symptoms, where each second symptom is mapped to one or more second log categories. The support cases repository 126, the method of generating the second lookup table 128, and the content of the second lookup table 128 are discussed in greater details below.

During operation of the data center 103, the computing system 104 may generate alert data when it encounters a fault event or issue or during maintenance of the computing system 104. In such situations, the computing system 104 may simultaneously record the fault event in corresponding log file of a plurality of log files, in the computing system 104.

In one example, the fault event relates to memory of the computing system 104. In this example, one or more memory components of the computing system 104 fail to store data in a correct memory location or not store the data at all, or become unresponsive. In such situations, the computing system 104 generates the alert data and simultaneously record the fault event in a log file corresponding to the memory in the computing system 104.

In one or more examples, the log file may be simple text file, while in other examples the log file may be structured file, for example, extensible markup language (XML) file, hypertext markup language (HTML) file, and the like. It should be noted herein that the log files belonging to some related components can be grouped together under one log category. For example, the log files belonging to some related components, such as a dual data rate (DDR) memory component or a load-reduced dual inline memory (LRDIMM) component may be grouped together under a memory category. Similarly, log files belonging to some related components, such as fan or thermal sensors may be grouped together under thermal/fan log category. In one or more embodiments, the alert data may be events or parameters corresponding to the fault event. In non-limiting examples, the events may be event logs (IEL), redfish events, and the like. Similarly, the parameters may be system management BIOS records, machine checks (MCA) banks, sensors data, and the like.

The alert monitoring engine 114 may subscribe to the data center 103 for receiving the alert data from the computing system 104. In such embodiments, when the alert data gets generated by the computing system 104, the alert monitoring engine 114 may receive the generated alert data from the management controller of the computing system 104, over a management network or production network or both (not shown in FIG. 1). In some examples, the management controller may filter the alert data and send the refined alert data to the alert monitoring engine 114. In some other examples, the management controller may send the entire alert data to the alert management engine 114, where the filtering of the alert data may be performed by the management system 102 to generate the refined alert data. Subsequently, the alert monitoring engine 114 may forward the refined alert data to the symptom analyzer engine 116.

In some embodiments, the symptom analyzer engine 116 may be a rule based engine, which receives the refined alert data from the alert monitoring engine 114 and parses the refined alert data to identify a current symptom associated with the issue. It should be noted herein that the rule based engine may be any standard engine that may execute one or more rules on the alert data for identifying the current symptom. The rule based engine may be modified/customized by administrator of the management system 102 so as to improvise the functionality of identifying the current symptom from the alert data.

In one example, the symptom analyzer engine 116 identifies that the current symptom corresponding to the fault event in the computing system 104 is a memory module failure.

Further, the symptom analyzer engine 116 may determine whether the current symptom exists in the first lookup table 120. In particular, the symptom analyzer engine 116 may compare the current symptom with a plurality of first symptoms listed in the first lookup table 120 to determine whether the current symptom exists in the first lookup table 120. Table-1 depicted below represents a sample first lookup table 120.

TABLE 1

| PLURALITY OF FIRST SYMPTOMS | ONE OR MORE FIRST LOG CATEGORIES |
| --- | --- |
| Fan failure, fan noise is severe, fan redundancy lost | Thermal, Fan sensor |
| Power supply failure, power threshold breach, power protection fault | Power, SM-BIOS power record |
| Memory module failure, correctable/uncorrectable memory error detected | Memory, BIOS |
| Firmware update failure | Smart update manager, BMC update |

The sample first lookup table 120, represented in table-1 may include two columns, where the first column may represent the plurality of first symptoms (pre-determined symptoms) and the second column may represent one or more first log categories related or contextual to the first symptoms listed in the first column. In other words, each row in table-1 may include at least one first symptom, which is mapped to one or more first log categories.

The symptom analyzer engine 116 may first determine whether the current symptom exists in the first lookup table 120. Thus, in response to determining that the current symptom exists in the first lookup table 120, the symptom analyzer engine 116 may further lookup into the first lookup table 120 to identify the one or more first log categories mapped to the first symptom in first lookup table 120.

In one example, the symptom analyzer engine 116 determines that the memory module failure symptom exists in table-1. Upon determining that the memory module failure symptom exists in table-1, the symptom analyzer engine 116 may further lookup into the table-1 to identify the one or more first log categories mapped to the memory module failure symptom in table-1. Accordingly, the symptom analyzer engine 116 identifies that memory and BIOS categories are mapped to the memory module failure symptom in table-1.

Thereafter, the data retriever engine 118 may create an application programming interface (API) to collect one or more log files from the plurality of log files in the computing system 104, which corresponds to the identified one or more first log categories in the first lookup table 120 (table-1). Accordingly, the data retriever engine 118 may request, collect, and transfer the contextual log files which corresponds to the identified one or more first log categories from the computing system 104 to the external computing system 106 for performing diagnostics on the issue.

In one example, the data retriever engine 118 requests, collects, and transfers the log files corresponding to the memory and BIOS categories from the computing system 104 to the external computing system for performing diagnostics on the issue. It should be noted herein that the management system 102 may collect the log files from the computing system 104, whenever the failure events or errors occurs in the computing system 104.

Since, the management system 102 collects and transfers the contextual log files from the computing system 104 to the external computing system 106, whenever the fault events or errors occurs in the computing system 102, the management system 102 may reduce unnecessary consumption of the computing resources, such as network, storage, CPU, and memory associated with collecting, transferring, storing, and processing of the super set of log files.

In one embodiment, the support automation engine 122 of the external computing system 106, may receive the one or more logs files from the computing system 104 through the management system 102. Accordingly, the support automation engine 122 may create support case, attach the one or more log files to the support case, and provide the one or more log files to support engineers (backend support team) for investigating and root causing the issue for the support case. Accordingly, the management system 102 may help the backend support team to analyze only the contextual log files, which may be relevant to the issue to quickly characterize/root cause the issue in the computing system 104.

Further, the support automation engine 122 may store the support case, the one or more log files related to the support case, and resolutions for the issue belonging to the support case in a support cases repository 126. It should be noted herein that the support cases repository 126 may additionally include historical support cases (plurality of support cases), the log files related to each support case, and resolutions for each support case. Those historical support cases may have been collected/created in the past by the support automation engine 122 during various customer case creation process.

In one or more embodiments, the data analytics engine 124 may scan and process the historical support cases stored in the support cases repository 126 to filter out insignificant support cases, whose information is not rich and/or relevant, so as to generate a refined list of historical support cases. It should be noted herein that the insignificant support cases may relate to those cases, where, for example, the case description and title are not clear or not available, or the resolution is not available, or the issue is not clearly recorded, and the like. In certain embodiments, the data analytics engine 124 may use one or more natural language processing (NLP) algorithms for processing the historical support case to generate the refined list of historical support cases.

Once the refined list of historical support cases is generated, the data analytics engine 124 may further analyze the refined list to generate a data set having a structured information. In particular, the data analytics engine 124 may use the one or more NLP algorithms to analyze the case description and title, and/or administrator notes related to the support case, for identifying the second symptom for each case. In some embodiments, the second symptom may be a reported or identified symptom by the administrator and recorded along with the case description for some cases. Similarly, the data analytics engine 124 may use the one or more NLP algorithms to analyze the resolutions and/or engineering notes associated with each case to identify one or more second log categories associated with the second symptom for each support case. In one or more embodiments, the final data set may include i) case number, ii) case description, iii) second symptom, iv) resolutions, and v) one or more second log categories, for each case listed in the refined list of historical cases. Table-2 depicted below represents a sample data set. It should be noted herein that the i) case description and ii) resolution are not shown in table-2, for the purpose of ease of illustration.

TABLE 2

| CASE ID | PLURALITY OF SECOND SYMPTOMS | ONE OR MORE SECOND LOG CATEGORIES |
| --- | --- | --- |
| 1 | Fan failure | Fan sensor |
| 2 | Power supply failure | Power |

TABLE 2-continued

| CASE ID | PLURALITY OF SECOND SYMPTOMS | ONE OR MORE SECOND LOG CATEGORIES |
| --- | --- | --- |
| 3 | Fan noise is severe | Thermal |
| 4 | Power threshold breach | SM-BIOS power record |
| 5 | Fan noise is severe | Thermal |
| 6 | Memory module failure | Memory |
| 7 | Firmware update failure | Smart update manager |
| 8 | Memory module failure | BIOS |
| 9 | Fan redundancy lost | Fan sensor |
| 10 | Power protection fault | SMBIOS power record |
| 11 | Firmware update failure | Smart update manager |
| 12 | Power supply failure | Power |
| 13 | Thermal failure | Fan sensor |
| 14 | Firmware update failure | BMC update |
| 15 | Correctable memory error detected | BIOS |
| 16 | Uncorrectable memory error detected | Memory |
| 17 | Firmware update failure | BMC update |
| 18 | Thermal failure | Thermal |
| 19 | No boot | DIMM |

In one or more embodiments, the final data set may include the plurality of second symptoms and the plurality of second log categories, where at least one second symptom is associated to at least one second log category, as shown in table-2.

The data analytics engine 124 may further apply a clustering algorithm, such as k-means to cluster a related symptom from the plurality of second symptoms listed in the data set (table-2) to form a group of related symptoms. Table-3 depicted below represents the group of related symptoms. It should be noted that the case number is not shown in table-3 for the purpose of ease of illustration. It should be noted herein that the term "related symptom" means the type of symptoms that are "linked or similar or dependent or common" to each other. The related symptoms may be grouped into a group of related symptoms. In other words, the related symptoms include the type of symptoms, which have impacts on the specific set of categories or meets the same group categories.

TABLE 3

| RELATED SYMPTOMS | ONE OR MORE SECOND LOG CATEGORIES | GROUP OF RELATED SYMPTOMS |
| --- | --- | --- |
| Fan failure | Fan sensor | Fan failure group |
| Fan noise is severe | Thermal | |
| Fan noise is severe | Thermal | |
| Fan redundancy lost | Fan sensor | |
| Power supply failure | Power | Power supply failure group |
| Power threshold breach | SM-BIOS power record | |
| Power protection fault | SMBIOS power record | |
| Power supply failure | Power | |
| Memory module failure | Memory | Memory module failure group |
| Correctable memory error detected | BIOS | |
| Memory module failure | BIOS | |
| Uncorrectable memory error detected | Memory | |
| Firmware update failure | Smart update manager | Firmware update failure group |
| Firmware update failure | Smart update manager | |
| Firmware update failure | BMC update | |
| Firmware update failure | BMC update | |
| Thermal failure | Fan sensor | Thermal failure group |
| Thermal failure | Thermal | |
| No boot | DIMM | No boot group |

Further, the data analytics engine 124 may apply a correlation algorithm, such as a centroid based algorithm to identify the related symptom having similar log category in each group of related symptoms, so as to form a plurality of matching pairs in each group of related symptoms. Referring to table-3, the correlation algorithm may form the plurality of matching pairs, such as i) a fan failure, fan redundancy lost, and fan sensor pair, ii) a fan noise is severe, and thermal pair, iii) a power supply failure and power pair, iv) a power threshold breach, power protection fault, and SM-BIOS power record pair, and the like.

TABLE 4

| RELATED SYMPTOMS | ONE OR MORE SECOND LOG CATEGORIES | GROUP OF RELATED SYMPTOMS | RATED MATCHING PAIRS |
|---|---|---|---|
| Fan failure, fan redundancy lost | Fan sensor | Fan failure group | 2 |
| Fan noise is severe | Thermal | | 2 |
| Power supply failure | Power | Power supply failure group | 2 |
| Power threshold breach, power protection fault | SM-BIOS power record | | 2 |
| Memory module failure, uncorrectable memory error detected | Memory | Memory module failure group | 2 |
| Correctable memory error detected | BIOS | | 2 |
| Firmware update failure | Smart update manager | Firmware update failure group | 2 |
| Firmware update failure | BMC update | | 2 |
| Thermal failure | Fan sensor | Thermal failure group | 1 |
| Thermal failure | Thermal | | 1 |
| No boot | DIMM | No boot group | 1 |

The data analytics engine 124 may further apply the correlation algorithm to rate the plurality of matching pairs in each group of related symptoms, based on number of occurrence of the plurality of matching pairs. Table-4 depicted below represents rated matching pairs in each group of related symptoms.

Further, the data analytics engine 124 may apply the correlation algorithm to map the related symptom to one or more log categories in each group of related symptoms, based on weighted average of the rating for the plurality of matching pairs in each group of related symptoms, so as to generate a second lookup table 128. In one embodiment, the weighted average may be defined by the administrator of the external computing system 106. In one example, the weighted average is determined as "2", with a tolerance of about "0.5". Based on the weighted average as discussed herein, the related symptoms, such as thermal failure and no boot, which has the ranking of "1" may not get listed in the second lookup table 128. Table-5 depicted below represents an example second lookup table 128.

TABLE 5

| PLURALITY OF SECOND SYMPTOMS | ONE OR MORE SECOND LOG CATEGORIES |
|---|---|
| Fan failure, fan redundancy lost, fan noise is severe | Thermal, Fan sensor |
| Power supply failure, power threshold breach, power protection fault | Power, SM-BIOS power record |
| Memory module failure, uncorrectable memory error detected, correctable memory error detected | Memory, BIOS |
| Firmware update failure | Smart update manager, BMC update |

The sample second lookup table 128, represented in table-5 may include two columns, where the first column may represent the plurality of second symptoms and the second column may represent the plurality of second log categories related or contextual to the second symptoms listed in the first column. In other words, each row in table-5 may include at least one second symptom, which is mapped to one or more second log categories.

In the example embodiment, the first lookup table 120 and the second lookup table 128 are identical to one another. In such example embodiment, the external computing system 106 may transfer a copy of the second lookup table 128 to the management system 102, which may store the copy of the second lookup table 128 as the first lookup table 120 in the first machine readable medium of the management system 102. Accordingly, the management system 102 may use the first lookup table 120 to perform on premise lookup of the current symptom in the first lookup table 120, as discussed above.

Referring back to the functionality of determining whether the current symptom exists in the first lookup table 120 by the symptom analyzer engine 116, as discussed above. In response to determining that the current symptom do not exists in the first lookup table 120, the data retriever engine 118 may collect and transfer the plurality of log files (all log files) from the computing system 104 to the external computing system 106.

As discussed herein the support automation engine 122 may create a new support case, attach the plurality of log files to the new support case, and provide the plurality of log files to support engineers for investigating and root causing the issue for the new support case. Further, the support automation engine 122 may store the new support case, the plurality of log files related to the new support case, and resolutions belonging to the new support case in the support cases repository 126.

The data analytics engine 124 may then analyze the new support case to identify a fresh symptom and at least one fresh log category or the second log category associated with the fresh symptom. In one example, the identified fresh symptom may be no boot symptom. It should be noted herein that the term "fresh symptom" refers to a "new symptom" that is not listed in the first lookup table 120.

In such examples, the data analytics engine 124 may determine whether the fresh symptom exists in the data set, as represented in table-2. In one example, the no boot symptom exists in the data set represented in table-2. Accordingly, in response to determining that the fresh symptom exists in the data set represented in table-2, the data analytics engine 124 updates the fresh symptom and the at least one fresh log category or the second log category, in the data set (table-2) to form a new data set. Table-6 depicted below represents a sample new data set.

TABLE 6

| CASE ID | PLURALITY OF SECOND SYMPTOMS AND FRESH SYMPTOM | ONE OR MORE SECOND LOG CATEGORIES AND/OR FRESH LOG CATEGORY |
|---|---|---|
| 1 | Fan failure | Fan sensor |
| 2 | Power supply failure | Power |
| 3 | Fan noise is severe | Thermal |
| 4 | Power threshold breach | SM-BIOS power record |
| 5 | Fan noise is severe | Thermal |
| 6 | Memory module failure | Memory |
| 7 | Firmware update failure | Smart update manager |
| 8 | Memory module failure | BIOS |
| 9 | Fan redundancy lost | Fan sensor |
| 10 | Power protection fault | SMBIOS power record |
| 11 | Firmware update failure | Smart update manager |
| 12 | Power supply failure | Power |
| 13 | Thermal failure | Fan sensor |
| 14 | Firmware update failure | BMC update |
| 15 | Correctable memory error detected | BIOS |
| 16 | Uncorrectable memory error detected | Memory |
| 17 | Firmware update failure | BMC update |
| 18 | Thermal failure | Thermal |
| 19 | No boot | DIMM |
| 20 | No boot | DIMM |

The data analytics engine 124 may further apply the clustering algorithm to cluster the related symptom from the plurality of second symptoms and the fresh symptom listed in the new data set to form a new group of related symptoms. Table-7 depicted below represents the new group of related symptoms.

TABLE 7

| RELATED SYMPTOMS | ONE OR MORE SECOND LOG CATEGORIES AND/OR FRESH LOG CATEGORY | NEW GROUP OF RELATED SYMPTOMS |
|---|---|---|
| Fan failure | Fan sensor | Fan failure group |
| Fan noise is severe | Thermal | |
| Fan noise is severe | Thermal | |
| Fan redundancy lost | Fan sensor | |
| Power supply failure | Power | Power supply failure group |
| Power threshold breach | SM-BIOS power record | |
| Power protection fault | SMBIOS power record | |
| Power supply failure | Power | |
| Memory module failure | Memory | Memory module failure group |
| Correctable memory error detected | BIOS | |
| Memory module failure | BIOS | |
| Uncorrectable memory error detected | Memory | |
| Firmware update failure | Smart update manager | Firmware update failure group |
| Firmware update failure | Smart update manager | |
| Firmware update failure | BMC update | |
| Firmware update failure | BMC update | |
| Thermal failure | Fan sensor | Thermal failure group |
| Thermal failure | Thermal | |
| No boot | DIMM | No boot group |
| No boot | DIMM | |

Further, the data analytics engine 124 may apply the correlation algorithm to identify the related symptom having similar log category in each new group of related symptoms, so as to form a plurality of new matching pairs in each new group of related symptoms. Referring to table-7, the correlation algorithm may form the plurality of new matching pairs, such as i) a fan failure and fan sensor pair, ii) a fan noise is severe and thermal pair, iii) a no boot and DIMM pair, and the like.

The data analytics engine 124 may further apply the correlation algorithm to rate the plurality of new matching pairs in each new group of related symptoms, based on number of occurrence of each of the plurality of new matching pairs. Table-8 depicted below represents rated new matching pairs for each new group of related symptoms.

TABLE 8

| RELATED SYMPTOMS | ONE OR MORE SECOND LOG CATEGORIES AND/OR FRESH LOG CATEGORY | NEW GROUP OF RELATED SYMPTOMS | NEW RATED MATCHING PAIRS |
|---|---|---|---|
| Fan failure, fan redundancy lost | Fan sensor | Fan failure group | 2 |
| Fan noise is severe | Thermal | | 2 |
| Power supply failure | Power | Power supply failure group | 2 |
| Power threshold breach, power protection fault | SM-BIOS power record | | 2 |
| Memory module failure, uncorrectable memory error detected | Memory | Memory module failure group | 2 |
| Correctable memory error detected | BIOS | | 2 |
| Firmware update failure | Smart update manager | Firmware update failure group | 2 |
| Firmware update failure | BMC update | | 2 |
| Thermal failure | Fan sensor | Thermal failure group | 1 |
| Thermal failure | Thermal | | 1 |
| No boot | DIMM | No boot group | 2 |

Further, the data analytics engine 124 may apply the correlation algorithm to map the related symptom to one or more log categories in each new group of related symptoms, based on the weighted average of the rating for the plurality of new matching pairs in each new group of related symptoms, so as to generate a third lookup table. Table-9 depicted below represents an example third lookup table, where the fresh symptom and the correlated log category is added to the third lookup table.

TABLE 9

| PLURALITY OF SECOND SYMPTOMS | ONE OR MORE SECOND LOG CATEGORIES |
|---|---|
| Fan failure, fan redundancy lost, fan noise is severe | Thermal, Fan sensor |
| Power supply failure, power threshold breach, power protection fault | Power, SM-BIOS power record |
| Memory module failure, uncorrectable memory error detected, correctable memory error detected | Memory, BIOS |
| Firmware update failure | Smart update manager, BMC update |
| No boot | DIMM |

The data analytics engine 124 may further determine whether the second lookup table 128 (table-5) and the third lookup table (table-9) are identical to one another. In response, to determining that the second lookup table (table-5) and the third lookup table (table-9) are not identical to one another, the data analytics engine 124 may replace the second lookup table 128 (table-5) with the third lookup table (table-9) in the second machine readable medium. The data analytics engine 124 may further transfer a copy of the replaced second lookup table (table-9), to the management system 102. The management system 102 may replace the first lookup table 120 (table-1) with the copy of the replaced second lookup table (table-9) in the first machine readable medium. In such embodiment, the management system 102 may use the replaced first lookup table (table-9) to perform on premise lookup of the current symptom in the replaced first lookup table (table-9), as discussed above.

Thus, the external computing system 106 may additionally teach usage of machine learning techniques to continuous refine the second lookup table 128 by identifying and correlating new/fresh symptoms with associated log categories.

In certain embodiments, the first lookup table 120 (table-1) or the replaced first lookup table (table-9) may additionally include support case numbers and resolutions for each first symptom. This may assist the administrator of the computing system 104 to analyze the resolutions related to the case number to immediately fix the issue in the computing system 104.

Figure 2A:
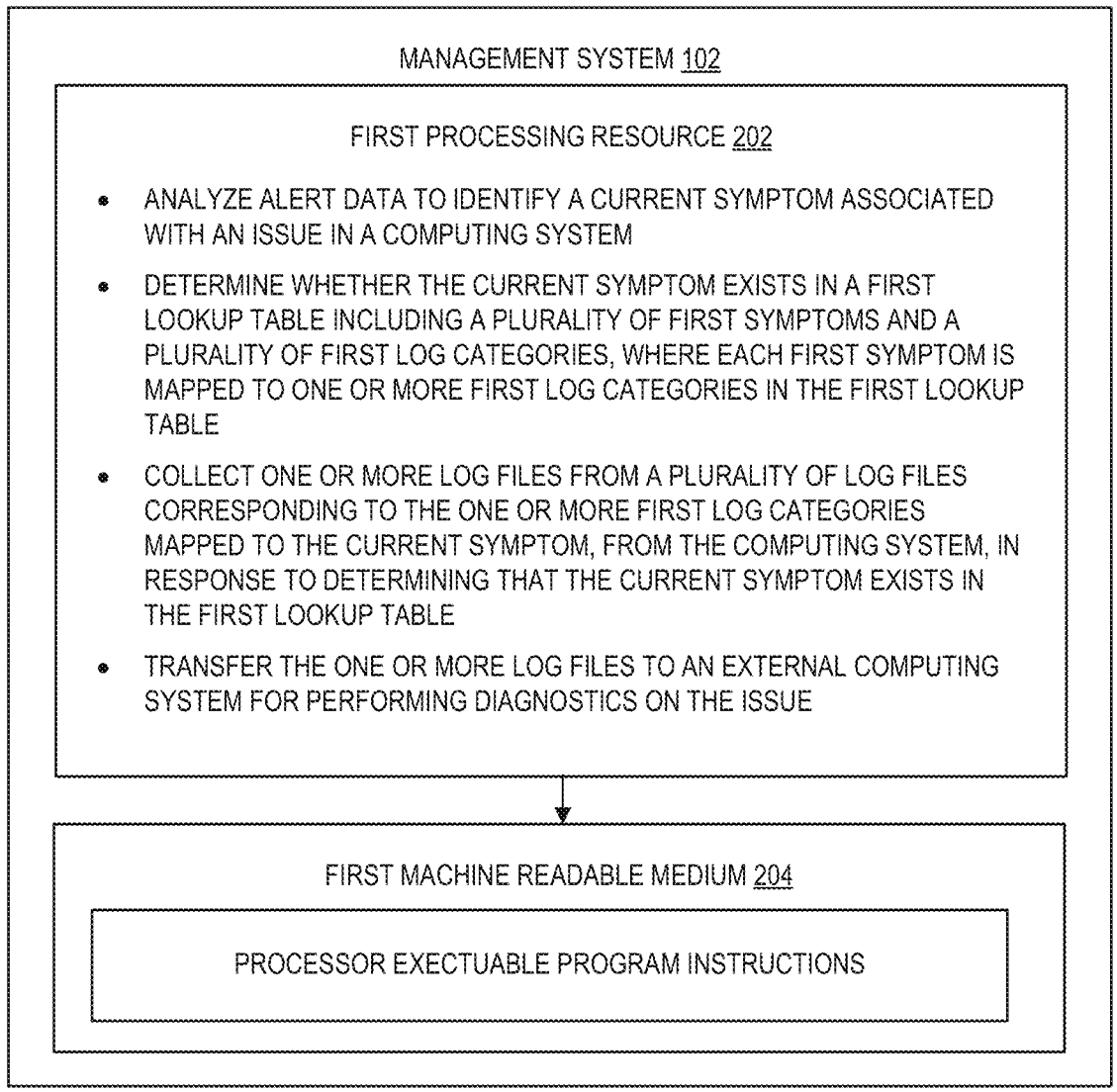
FIG. 2A is a block diagram depicting a management system having a first processing resource operably coupled to a first machine readable medium storing executable program instructions.

FIG. 2A illustrates a block diagram of a management system 102 including a first processing resource 202 and a first machine readable medium 204 storing executable program instructions. It should be noted herein that the management system 102 referred to in FIG. 2A may be same or similar to management system described in FIG. 1. In the example embodiment, the first processing resource 202 is operably coupled to the first machine readable medium 204. The first processing resource 202 may be a physical processor. In some examples, the physical processor may be at least one of a central processing unit (CPU), a microprocessor, and/or other hardware devices suitable for performing the functionality described in relation to FIG. 1. In some examples, the first machine readable medium 204 is non-transitory and is alternatively referred to as a non-transitory machine readable medium 204.

The first processing resource 202 executes one or more program instructions to perform one or more functions described in FIG. 1. For example, the first processing resource 202 may execute program instructions to analyze alert data to identify a current symptom associated with an issue in a computing system. The details of analyzing the alert data is described in FIG. 1. The first processing resource 202 may further execute the program instructions to determine whether the current symptom exists in a first lookup table including a plurality of first symptoms and a plurality of first log categories, where each first symptom is mapped to one or more first log categories in the first lookup table. The details of determining whether the current symptom exists in the first lookup table is described in FIG. 1. Further, the first processing resource 202 may execute the program instructions to collect one or more log files from a plurality of log files corresponding to the one or more first log categories mapped to the current symptom, from the computing system, in response to determining that the current symptom exists in the first lookup table. The details of collecting the one or more log files is described in FIG. 1. The first processing resource 202 may further execute the program instructions to transfer the one or more log files to the external computing system for performing diagnostics on the issue. The details of transferring the one or more log files is described in FIG. 1.

Figure 2B:
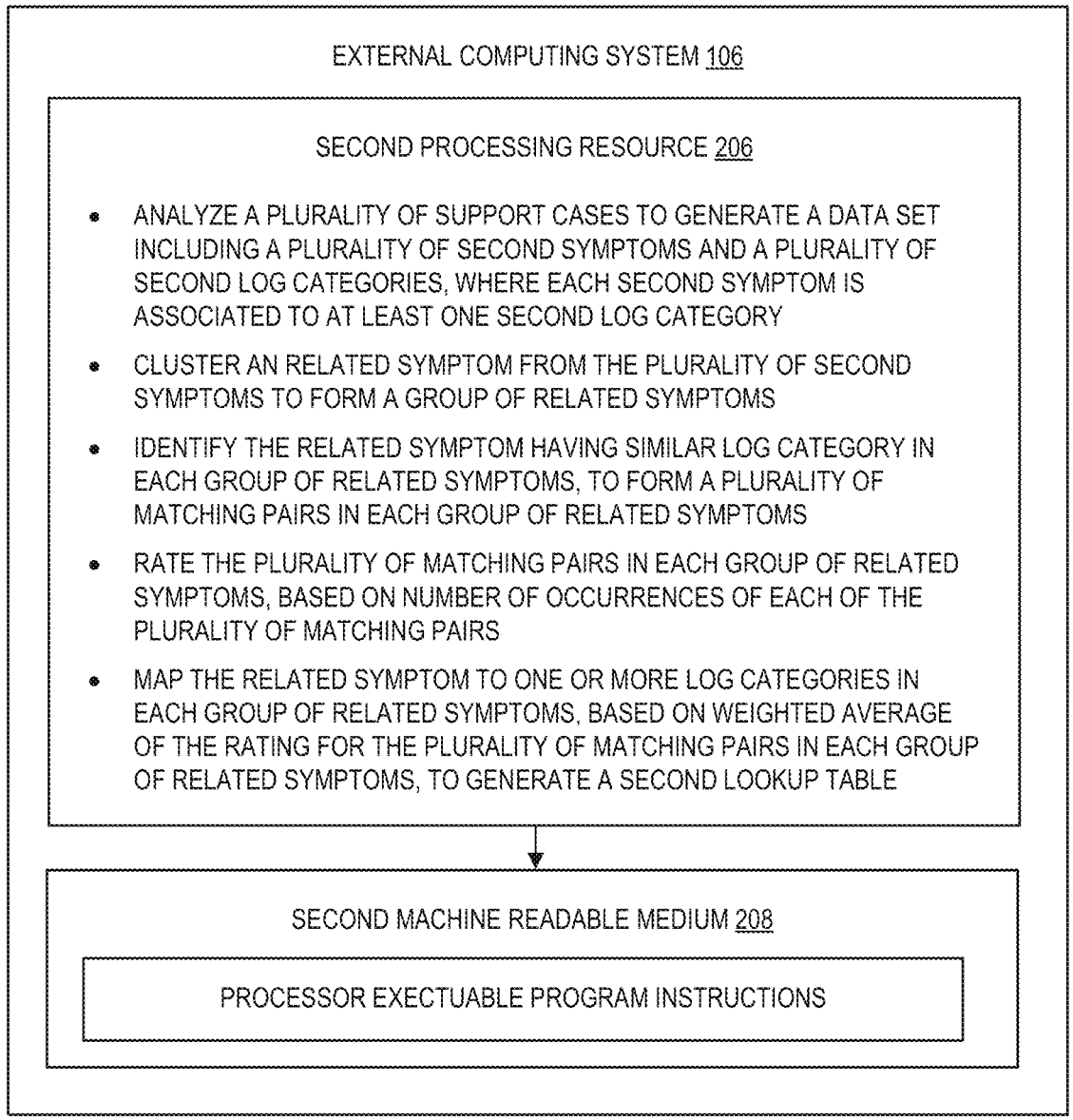
FIG. 2B is a block diagram depicting an external computing system having a second processing resource operably coupled to a second machine readable medium storing executable program instructions.

FIG. 2B is a block diagram of an external computing system 106 including a second processing resource 206 and a second machine readable medium 208 storing executable program instructions. It should be noted herein that the external computing system 106 referred to in FIG. 2B may be same or similar to external computing system described in FIG. 1. In the example embodiment, the second processing resource 206 is operably coupled to the second machine readable medium 208. The second processing resource 206 may be a physical processor. In some examples, the physical processor may be at least one of a central processing unit (CPU), a microprocessor, and/or other hardware devices suitable for performing the functionality described in relation to FIG. 1. In some examples, the second machine readable medium 208 is non-transitory and is alternatively referred to as a non-transitory machine readable medium 208.

The second processing resource 206 executes one or more program instructions to perform one or more functions described in FIG. 1. For example, the second processing resource 206 may execute program instructions to analyze a plurality of support cases to generate a data set including a plurality of second symptoms and a plurality of second log categories, where each second symptom is associated to at least one second log category. The details of analyzing the support cases is described in FIG. 1. The second processing resource 206 may further execute the program instructions to cluster a related symptom from the plurality of second symptoms to form a group of related symptoms. The details of clustering the related symptom is described in FIG. 1. Further, the second processing resource 206 may execute the program instructions to identify the related symptom having similar log category in each group of related symptoms, to form a plurality of matching pairs in each group of related symptoms, and rate the plurality of matching pairs based on number of occurrences of each of the plurality of matching pairs. The details of identifying the related symptom and ranking the matching pairs are described in FIG. 1. The second processing resource 206 may further execute the program instructions to map the related symptom to one or more log categories in each group of related symptoms, based on weighted average of the rating for the plurality of matching pairs in each group of related symptoms, to generate a second lookup table. The details of mapping the related symptoms to one or more log categories to generate the second lookup table is described in FIG. 1.

Figure 3A:
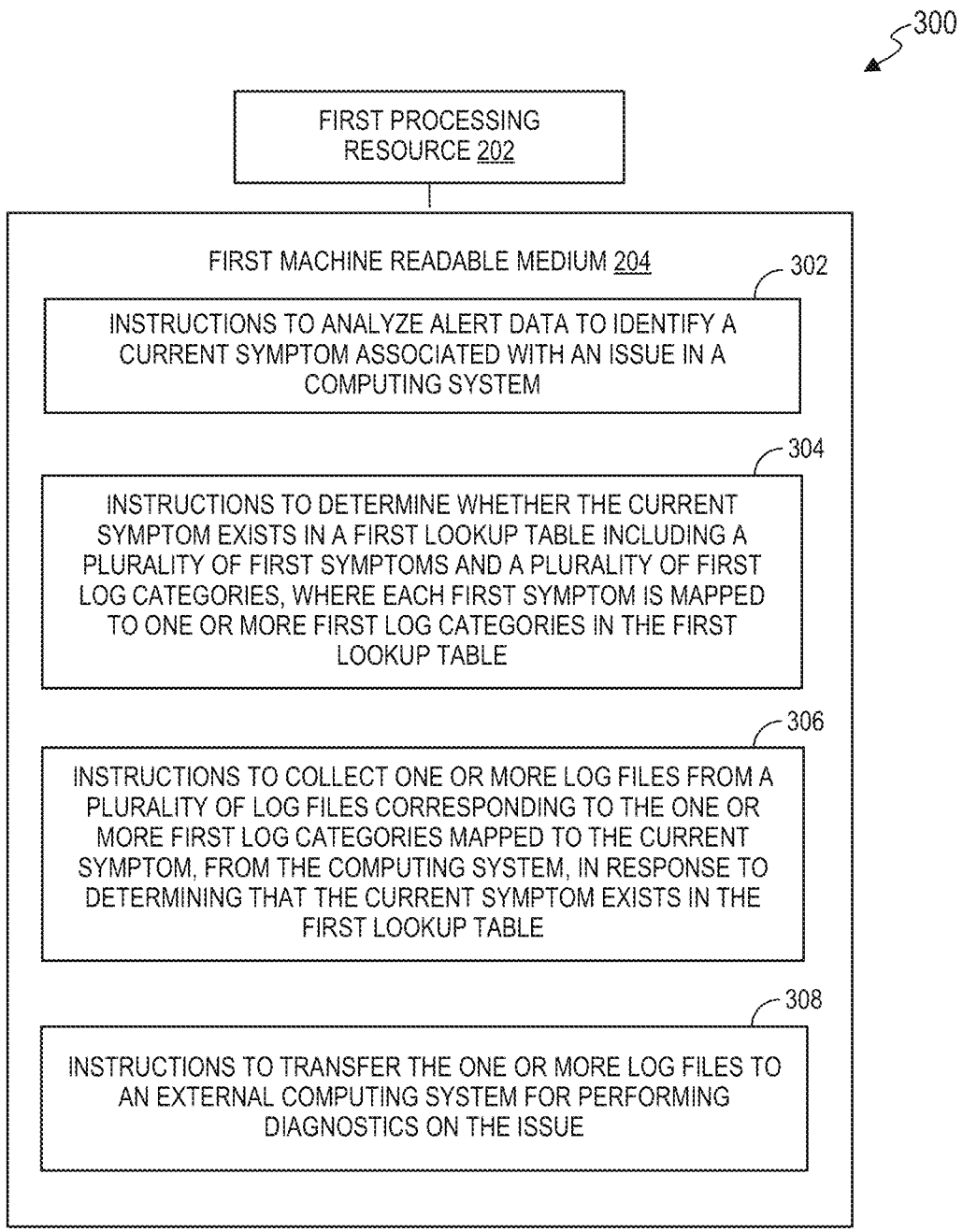
FIG. 3A is a block diagram depicting a first processing resource and a first machine readable medium encoded with example instructions to process data in a management system.
Figure 4:
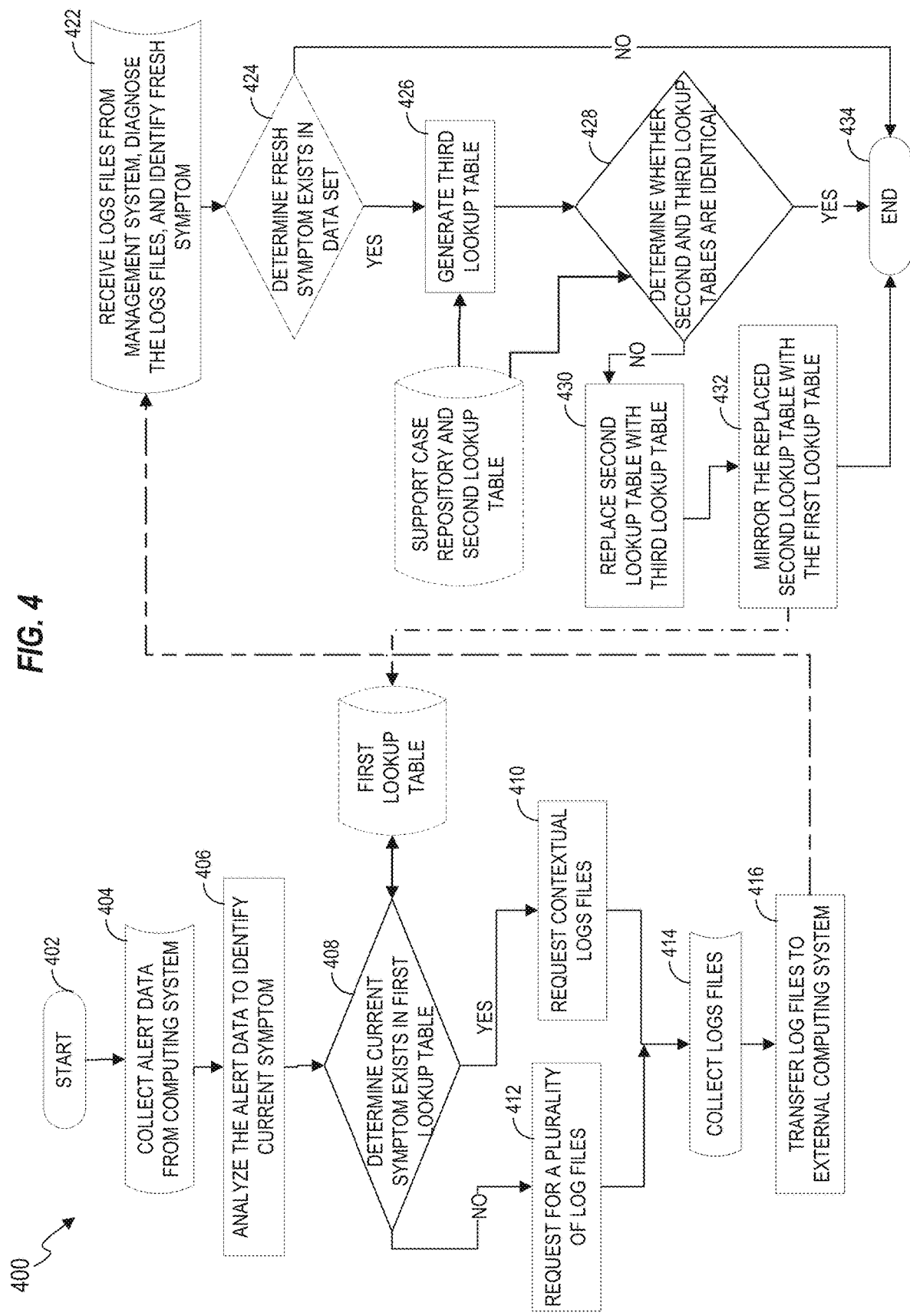
FIG. 4 is a flow diagram depicting a method to collect and transfer contextual log files from a computing system to an external computing system, and refine lookup table in the external computing system.

FIG. 3A is a block diagram 300 depicting a first processing resource 202 and a first machine readable medium 204 encoded with example instructions to collect and transfer contextual log files from a computing system 104 to an external computing system 106 by a management system 102. It should be noted that the management system 102, the computing system 104, and the external computing system 106 referred in FIG. 3A may be same or similar to management system, computing system, and external computing system respectively described in FIGS. 1 and 2A. The first machine readable medium 204 may be encoded with example instructions 302, 304, 306, 308. The instruction 302, when executed by the first processing resource 202, may implement aspects of analyzing alert data to identify a current symptom associated with an issue in the computing system, as described in FIG. 1. The instruction 304, when executed, may cause the first processing resource 202 to determine whether the current symptom exists in a first lookup table, as described in FIG. 1. The instruction 306, when executed, may cause the first processing resource 202 to collect one or more log files from a plurality of log files corresponding to one or more first log categories mapped to the current symptom, in response to determining that the current symptom exists in the first lookup table, as described in FIG. 1. Further, in some implementations, the instructions 308, when executed, may cause the first processing resource 202 to transfer the one or more log files to the external computing system for performing diagnostics on the issue, as described in FIG. 1.

Figure 3B:
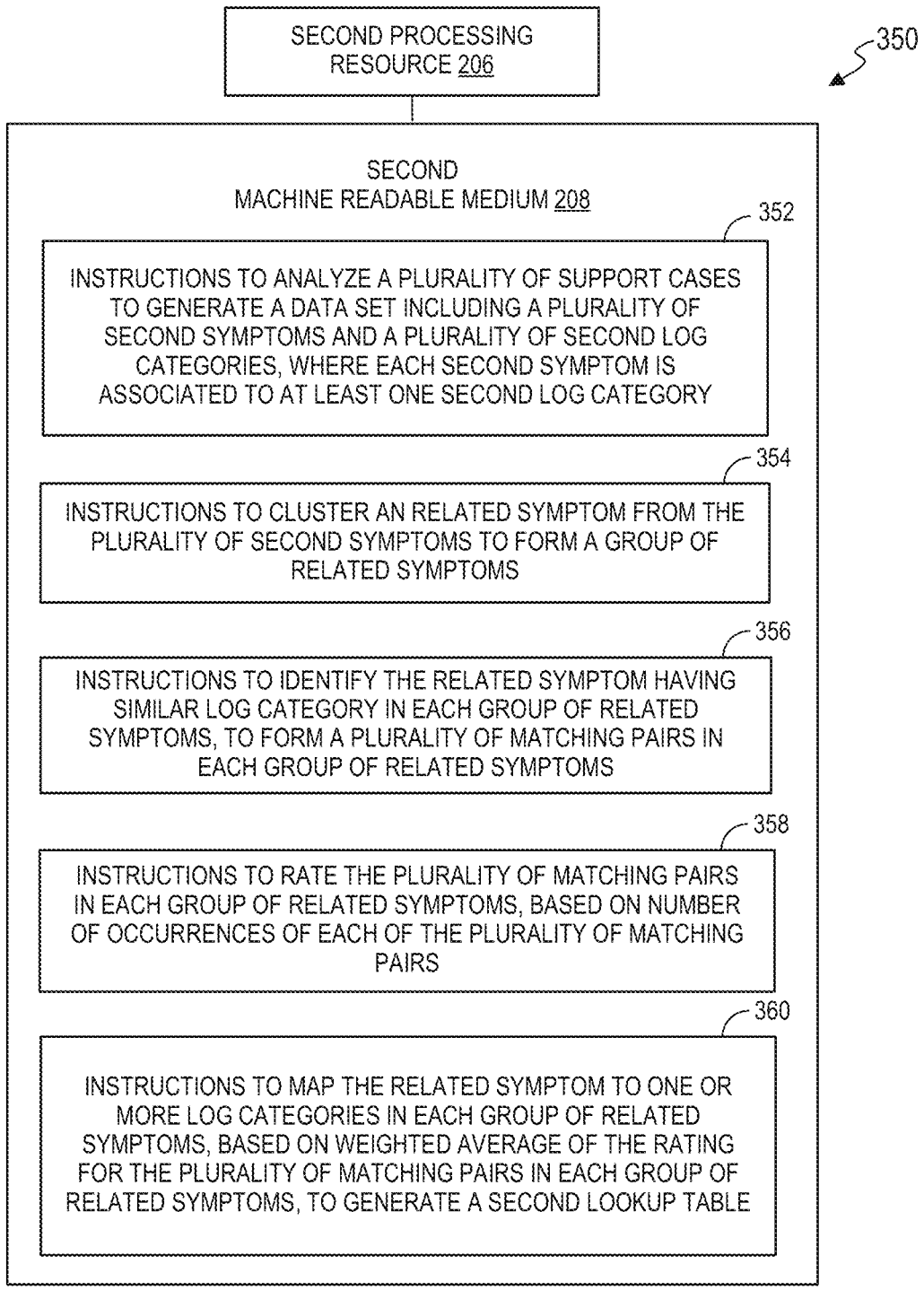
FIG. 3B is a block diagram depicting a second processing resource and a second machine readable medium encoded with example instructions to process data in an external computing system.

FIG. 3B is a block diagram 350 depicting a second processing resource 206 and a second machine readable medium 208 encoded with example instructions to generate a second lookup table in an external computing system 106. It should be noted herein that the external computing system 106 referred in FIG. 3B may be same or similar to the external computing system described in FIGS. 1 and 2B. The second machine readable medium 208 may be encoded with example instructions 352, 354, 356, 358, 360. The instruction 352, when executed by the second processing resource 206, may implement aspects of analyzing a plurality of support cases to generate a data set, as described in FIG. 1. The instruction 354, when executed, may cause the second processing resource 206 to cluster a related symptom from a plurality of related symptoms in the data set to form a group of related symptoms, as described in FIG. 1. Further, the instructions 356, when executed, may cause the second processing resource 206 to identify the related symptom having similar log category in each group of related symptoms to form a plurality of matching pairs in each group of related symptoms, as described in FIG. 1. The instructions 358, when executed, may cause the second processing resource 206 to rate the plurality of matching pairs in each group of related symptoms, based on number of occurrences of each of the plurality of matching pairs, as descried in FIG. 1. The instructions 360, when executed, may cause the second processing resource 206 to map related symptom to one or more log categories in each group, based on weighted average of the ranking to generate the second lookup table, as descried in FIG. 1.

FIG. 4 is a flow diagram depicting a method 400 to collect and transfer log files using a management system, and refine a lookup table using an external computing system. It should be noted herein that the method 400 is described in conjunction with FIG. 1. Further, the method 400 discussed herein includes two portions, where a first portion describes collecting and transferring log files, and a second portion describes refining the lookup table.

The first portion of the method 400 starts at block 402 and continues to block 404. At block 404, the method 400 includes collecting alert data related to the issue from a computing system by the management system. In some examples, the management system subscribes to the alert data of the computing system. In such examples, a management controller of the computing system may transfer the generated alert data to the management system, as described in FIG. 1. Further, the method 400 continues to block 406. At block 406, the method 400 includes analyzing the alert data to identify a current symptom associated with the issue. The management controller may include a rule based engine to parse the alert data and identify the current symptom from the alert data, as described in FIG. 1. The method 400 further continues to block 408. At block 408, the method includes determining whether the current symptom exists in a first lookup table. In some examples, the management system may compare the current symptom with a plurality of symptoms listed in a first lookup table to determine whether the current symptom exists in the first lookup table, as described in FIG. 1. At block 408, if it is determined that the current symptom exists in the first lookup table ("YES" at block 408), the management system may identify contextual log files related to the current symptom. In some examples, each of the plurality of symptoms listed in the first lookup table is mapped to a log file category. In such examples, in response to determining the current symptom exists in the first lookup table, the management system identifies the contextual log files related to the current symptom, as described in FIG. 1. Accordingly, the management system requests the computing system for the contextual log files, at block 410. However, at block 408, if it determined that the current symptom do not exists in the first lookup table ("NO" at block 408), the management system may request for a plurality of log files (i.e., all log files) in the computing system, at block 412, as described in FIG. 1. Further, the method 400 continues to block 414. At block 414, the management system collects the log files, i.e., either all log files or the contextual log files from the computing system, as per the determination made by the management system, at block 408. The method 400 further continues to block 416. At block 416, the management system transfers the log files to the external computing system over the network, as described in FIG. 1 for performing diagnostics of the issue.

The second portion of the method 400 starts at block 422. At block 422, the method 400 includes collecting log files, for example, the contextual log files from the management system, diagnosing the log files, and identifying a fresh symptom by the external computing system. In some examples, the external computing system may use one or more natural language processing (NLP) algorithms to process the log files and identify the fresh symptom, as described in FIG. 1. Further, the method 400 continues to block 424. At block 424, the method 400 includes determining whether the fresh symptom exists in a data set. It should be noted herein that the fresh symptom may already be listed in the data set that was generated initially while creating a second lookup table by the external computing system, as described in FIG. 1. At block 424, if it is determined that the fresh symptom does not exist in the data set ("NO" at block 424), the external computing system may end the second portion of the method 400 at block 434. However, at block 424, if it is determined that the fresh symptom exists in the data set ("YES" at block 424), the external computing system may generate a third lookup table using the data set stored in the support case repository, at block 426. It should be noted herein that the external computing system may perform the steps of clustering related symptoms to form a new group of related symptoms, identifying the related symptoms in each new group to form a plurality of new matching pairs, rate the plurality of new matching pairs, and map the related symptom to one or more log categories in each new group of related symptoms to generate the third lookup table, as described in FIG. 1. It should be noted herein that the support case repository may also store the second lookup table, which was generated using the historical support cases, as described in FIG. 1. The method 400 further continues to block 428. At block 428, the method 400 includes determining whether the second lookup table and the third lookup table are identical to one another. In some examples, the external computing system may compare the second and third lookup tables to determine the similarity among one another, as described in FIG. 1. At block 428, if it is determined that the second and third lookup tables are identical to one another ("YES" at block 428), the external computing system may end the second portion of the method 400 at block 434. However, at block 428, if it is determined that the second and third lookup tables are not identical to one another ("NO" at block 428), the external computing system may replace the second lookup table using the third lookup table, at block 430. In some examples, the external computing system may overwrite the second lookup table using the third lookup table, as described in FIG. 1. Further, the method 400 continues to block 432. At block 432, the method 400 includes mirroring or transferring a copy of the replaced second lookup table to the management system and getting the first lookup table been replaced with the copy of the replaced second lookup table. In some examples, the management system may also overwrite the first lookup table using the copy of the replaced second lookup table, as described in FIG. 1. Thereafter, the management system may use the replaced first lookup table for performing the on premise lookup of the current symptom, as described in FIG. 1. Thus, the second portion of the method 400 ends at block 434.

Various features as illustrated in the examples described herein may be implemented to collect and transfer contextual log files from a computing system to an external computing system for performing diagnostics of issue in the computing system. Since, a management system collects and transfers only the contextual log files, it reduces unnecessary consumption of the computing resources, such as network, storage, CPU, and memory associated with collecting, transferring, storing, and processing of the super set of log files. Further, the backend support team may need to analyze only the log files, which are relevant to the issue, thereby resulting in quickly characterize/root cause the issue. Additionally, the external computing system may teach usage of machine learning technique to continuous refine the second lookup table by identifying and correlating new/fresh symptoms and associated log categories.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
analyzing, by a first processing resource, alert data to identify a current symptom associated with an issue in a computing system;
determining, by the first processing resource, whether the current symptom exists in a first lookup table comprising a plurality of first symptoms and a plurality of first categories, wherein each first symptom is mapped to one or more first categories in the first lookup table;
in response to determining that the current symptom exists in the first lookup table, collecting, by the first processing resource, a subset of one or more log files from a plurality of log files corresponding to the one or more first categories mapped to the current symptom, from the computing system, wherein the subset of one or more log files is determined based on the one or more first categories mapped to the current symptom; and
transferring, by the first processing resource, the one or more collected log files to an external computing system for performing diagnostics on the issue.

2. The method of claim 1, wherein the alert data comprises one or more of events or parameters corresponding to the issue.

3. The method of claim 1, further comprising:
analyzing, by a second processing resource, a plurality of support cases to generate a data set comprising a plurality of second symptoms and a plurality of second categories, wherein each second symptom is associated to at least one second category;
clustering, by the second processing resource, a related symptom from the plurality of second symptoms to form a group of related symptoms;
identifying, by the second processing resource, the related symptom having similar category in each group of related symptoms, to form a plurality of matching pairs in each group of related symptoms;
rating, by the second processing resource, the plurality of matching pairs in each group of related symptoms, based on number of occurrences of each of the plurality of matching pairs; and
mapping, by the second processing resource, the related symptom to one or more categories in each group of related symptoms, based on weighted average of the rating for the plurality of matching pairs in each group of related symptoms, to generate a second lookup table.

4. The method of claim 3, wherein the first lookup table and the second lookup table are identical to one another.

5. The method of claim 3, wherein in response to determining that the current symptom do not exists in the first lookup table, collecting, by the first processing resource, the plurality of log files from the computing system and transferring the plurality of log files to the external computing system.

6. The method of claim 5, further comprising:
analyzing, by the second processing resource, the plurality of log files to identify a fresh symptom and at least one fresh category or the second category associated with the fresh symptom; and
determining, by the second processing resource, whether the fresh symptom exists in the data set.

7. The method of claim 6, further comprising:
in response to determining that the fresh symptom exists in the data set updating, by the second processing resource, the fresh symptom and the at least one fresh category or the second category into the data set;
clustering, by the second processing resource, the related symptom from the plurality of second symptoms and the fresh symptom to form a new group of related symptoms;
identifying, by the second processing resource, the related symptom having similar category in each new group of related symptoms, to form a plurality of new matching pairs in each new group of related symptoms;
rating, by the second processing resource, the plurality of new matching pairs in each new group of related symptoms, based on number of occurrences of each of the plurality of new matching pairs; and
mapping, by the second processing resource, the related symptom to one or more categories in each new group of related symptoms, based on weighted average of the rating for the plurality of new matching pairs in each new group of related symptoms, to generate a third lookup table.

8. The method of claim 7, further comprising determining, by the second processing resource, whether the second lookup table and the third lookup table are related.

9. The method of claim 8, further comprising in response to determining that the second lookup table and the third lookup table are not related:
replacing, by the second processing resource, the second lookup table with the third lookup table;
transferring, by the second processing resource, a copy of the replaced second lookup table, to the management system; and replacing, by the first processing resource, the first lookup table with the copy of the replaced second lookup table, in the management system.

10. The method of claim 1, wherein each first symptom is further mapped to at least one resolution and a support case identification number associated with the at least one resolution.

11. A management system comprising:
a first non-transitory machine readable medium storing program instructions; and
a first processing resource operably coupled to the first machine readable medium, wherein the first processing resource executes the program instructions to:
analyze alert data to identify a current symptom associated with an issue in a computing system;
determine whether the current symptom exists in a first lookup table comprising a plurality of first symptoms and a plurality of first categories, wherein each first symptom is mapped to one or more first categories in the first lookup table;
collect a subset of one or more log files from a plurality of log files corresponding to the one or more first categories mapped to the current symptom, from the computing system, wherein the subset of one or more log files is determined based on the one or more categories mapped to the current symptom in the first lookup table, in response to determining that the current symptom exists in the first lookup table; and
transfer the collected subset of one or more log files to an external computing system for performing diagnostics on the issue.

12. The management system of claim 11, wherein the external computing system comprises a second non-transitory machine readable medium storing program instructions and a second processing resource operably coupled to the second machine readable medium, wherein the second processing resource executes the program instructions to:
analyze a plurality of support cases to generate a data set comprising a plurality of second symptoms and a plurality of second categories, wherein each second symptom is associated to at least one second category;
cluster a related symptom from the plurality of second symptoms to form a group of related symptoms;
identify the related symptom having similar category in each group of related symptoms, to form a plurality of matching pairs in each group of related symptoms;
rate the plurality of matching pairs in each group of related symptoms, based on number of occurrences of each of the plurality of matching pairs; and
map the related symptom to one or more categories in each group of related symptoms, based on weighted average of the rating for the plurality of matching pairs in each group of related symptoms, to generate a second lookup table.

13. The management system of claim 12, wherein the first lookup table and the second lookup table are identical to one another.

14. The management system of claim 12, wherein the first processing resource further executes the program instructions in response to determining that the current symptom do not exists in the first lookup table to collect the plurality of log files from the computing system and transfer the plurality of log files to the external computing system.

15. The management system of claim 14, wherein the second processing resource further executes the program instructions to:
analyze the plurality of log files to identify a fresh symptom and at least one fresh category or the second category associated with the fresh symptom; and
determine whether the fresh symptom exists in the data set.

16. The management system of claim 15, wherein the second processing resource further executes the programming instructions in response to determining that the fresh symptom exists in the data set to:
update the fresh symptom and the at least one fresh category or the second category into the data set;
cluster the related symptom from the plurality of second symptoms and the fresh symptom to form a new group of related symptoms;
identify the related symptom having similar category in each new group of related symptoms, to form a plurality of new matching pairs in each new group of related symptoms;
rate the plurality of new matching pairs in each new group of related symptoms, based on number of occurrences of each of the plurality of new matching pairs; and
map the related symptom to one or more categories in each new group of related symptoms, based on weighted average of the rating for the plurality of new matching pairs in each new group of related symptoms, to generate a third lookup table.

17. The management system of claim 16, wherein the second processing resource further executes the programming instructions to determine whether the second lookup table and the third lookup table are identical.

18. The management system of claim 17, wherein the second processing resource further executes the programming instructions in response to determining that the second lookup table and the third lookup table are not identical to replace the second lookup table using the third lookup table and transfer a copy of the replaced second lookup table to the management system, and the first processing resource further executes the programming instructions to replace the first lookup table with the copy of the replaced second lookup table in the management system.

19. A non-transitory machine readable medium storing instructions executable by a first processing resource in a management system, the instructions comprising:
instructions to analyze alert data to identify a current symptom associated with an issue corresponding to a computing system;
instructions to determine whether the current symptom exists in a first lookup table comprising a plurality of first symptoms and a plurality of first categories, wherein each first symptom is mapped to one or more first categories in the first lookup table;
instructions to collect a subset of one or more log files from a plurality of log files, corresponding to the one or more first categories mapped to the current symptom, from the computing system, in response to determining that the current symptom exists in the first lookup table, wherein the subset of one or more log files is determined based on the one or more first categories mapped to the current symptom; and
instructions to transfer the collected subset of one or more log files to an external computing system for performing diagnostics on the issue.

20. The non-transitory machine readable medium of claim 19, wherein the instructions further comprises additional instructions executable by a second processing resource of the external computing system, the additional instructions comprising:

instructions to analyze a plurality of support cases to generate a data set comprising a plurality of second symptoms and a plurality of second categories, wherein each second symptom is associated to at least one second category;

instructions to cluster a related symptom from the plurality of second symptoms to form a group of related symptoms;

instructions to identify the related symptom having similar category in each group of related symptoms, to form a plurality of matching pairs in each group of related symptoms;

instructions to rate the plurality of matching pairs in each group of related symptoms, based on number of occurrences of each of the plurality of matching pairs; and instructions to map the related symptom to one or more categories in each group of related symptoms, based on weighted average of the rating for the plurality of matching pairs in each group of related symptoms, to generate a second lookup table.

* * * * *